(12) United States Patent
Ariumi

(10) Patent No.: US 11,664,882 B2
(45) Date of Patent: May 30, 2023

(54) RADIO WAVE REPEATER AND COMMUNICATION SYSTEM

(71) Applicant: Murata Manufacturing Co., Ltd., Kyoto (JP)

(72) Inventor: Saneaki Ariumi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/243,820

(22) Filed: Apr. 29, 2021

(65) Prior Publication Data

US 2021/0250079 A1 Aug. 12, 2021

Related U.S. Application Data

(63) Continuation of application No. PCT/JP2019/042017, filed on Oct. 25, 2019.

(30) Foreign Application Priority Data

Oct. 31, 2018 (JP) .............................. JP2018-205585

(51) Int. Cl.
*H01Q 1/12* (2006.01)
*H01Q 21/00* (2006.01)
(Continued)

(52) U.S. Cl.
CPC ............. *H04B 7/145* (2013.01); *H01Q 21/06* (2013.01); *H04B 7/10* (2013.01)

(58) Field of Classification Search
CPC . H04B 7/14; H04B 7/15; H04B 7/145; H01Q 1/00; H01Q 1/12; H01Q 1/44;
(Continued)

(56) References Cited

U.S. PATENT DOCUMENTS

| 6,448,930 B1 | 9/2002 | Judd |
| 7,027,770 B2 * | 4/2006 | Judd ..................... H01Q 1/007 455/11.1 |

(Continued)

FOREIGN PATENT DOCUMENTS

| CN | 1411637 A | 4/2003 |
| CN | 202455351 U | 9/2012 |

(Continued)

OTHER PUBLICATIONS

International Search Report for PCT/JP2019/042017 dated Dec. 17, 2019.
Written Opinion for PCT/JP2019/042017 dated Dec. 17, 2019.

*Primary Examiner* — Blane J Jackson
(74) *Attorney, Agent, or Firm* — Pearne & Gordon LLP

(57) ABSTRACT

A support has a first surface and a second surface, and directions of normal vectors of the first surface and the second surface pointing outside are different from each other. A first antenna is provided on the first surface, and a second antenna is provided on a second surface. A radio frequency signal received at the first antenna is transmitted through a transmission line to the second antenna, and a radio frequency signal received at the second antenna is transmitted through the transmission line to the first antenna. The first antenna, the second antenna, and the transmission line are configured such that the directivity of the first antenna is different from the directivity of the second antenna.

15 Claims, 15 Drawing Sheets

(51) Int. Cl.
  *H04B 7/145*   (2006.01)
  *H01Q 21/06*   (2006.01)
  *H04B 7/10*    (2017.01)

(58) Field of Classification Search
  CPC ...... H01Q 13/00; H01Q 13/22; H01Q 1/1228; H01Q 1/1221; H01Q 21/0006; H01Q 21/06; H01Q 21/065
  See application file for complete search history.

(56) References Cited

U.S. PATENT DOCUMENTS

| | | | |
|---|---|---|---|
| 7,577,398 B2 * | 8/2009 | Judd | G01S 19/25 |
| | | | 342/357.48 |
| 2003/0096575 A1 | 5/2003 | Tuttlebee | |
| 2007/0232228 A1 * | 10/2007 | McKay, Sr. | H04B 7/1555 |
| | | | 455/11.1 |
| 2009/0047900 A1 * | 2/2009 | Cruz | H01Q 1/007 |
| | | | 455/7 |
| 2017/0272145 A1 * | 9/2017 | Lilja | H01Q 21/0056 |

FOREIGN PATENT DOCUMENTS

| | | | | |
|---|---|---|---|---|
| JP | H08-084106 A | 3/1996 | | |
| JP | H08-331028 A | 12/1996 | | |
| JP | 2000-341189 A | 12/2000 | | |
| JP | 2003-517252 A | 5/2003 | | |
| JP | 2004-357196 A | 12/2004 | | |
| JP | 2005-072646 A | 3/2005 | | |
| WO | WO-0145303 A1 * | 6/2001 | ............. | H04B 7/145 |
| WO | 2009/119739 A1 | 10/2009 | | |
| WO | WO-2013136835 A1 * | 9/2013 | ............. | H01Q 19/30 |

\* cited by examiner

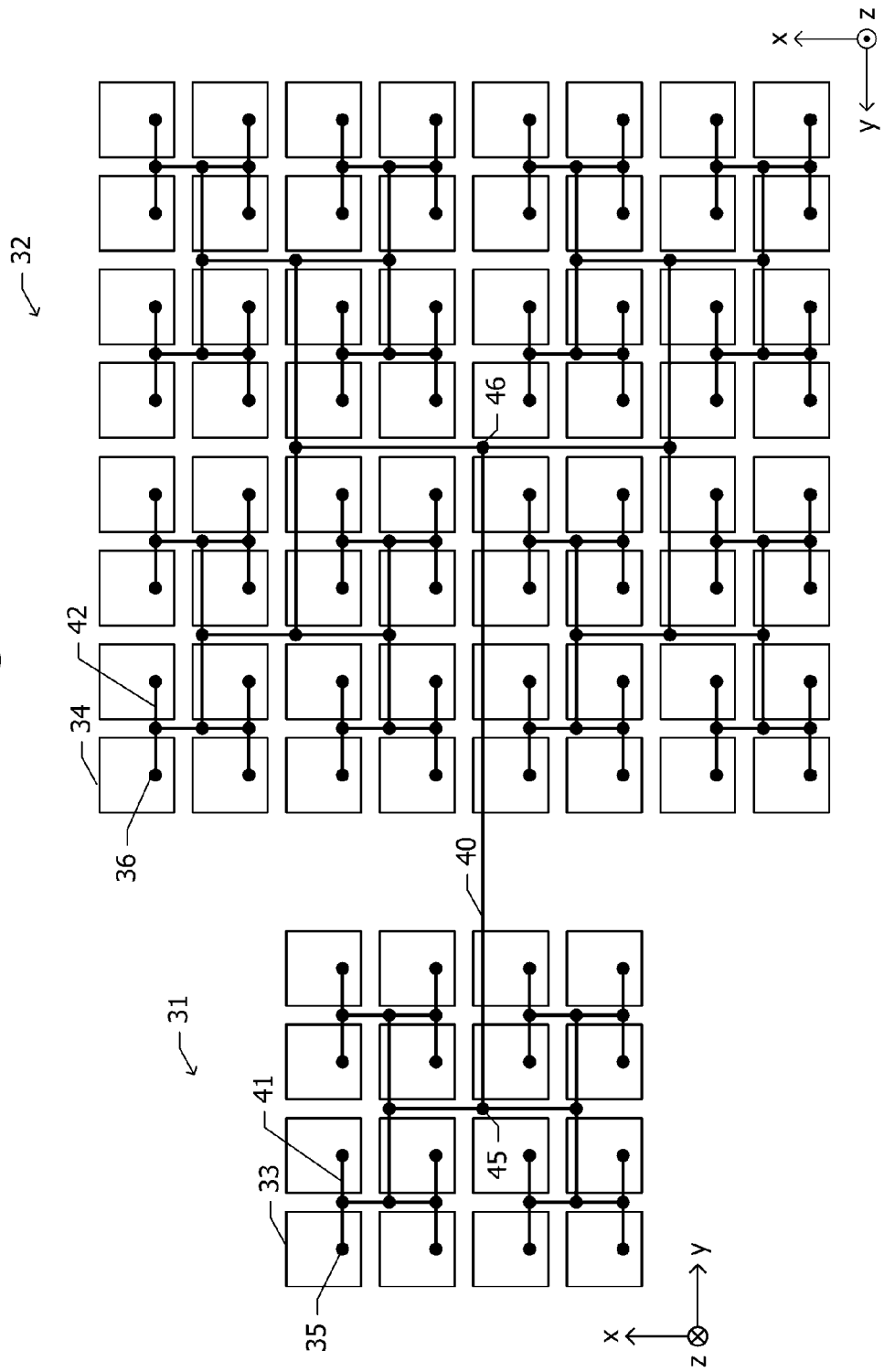

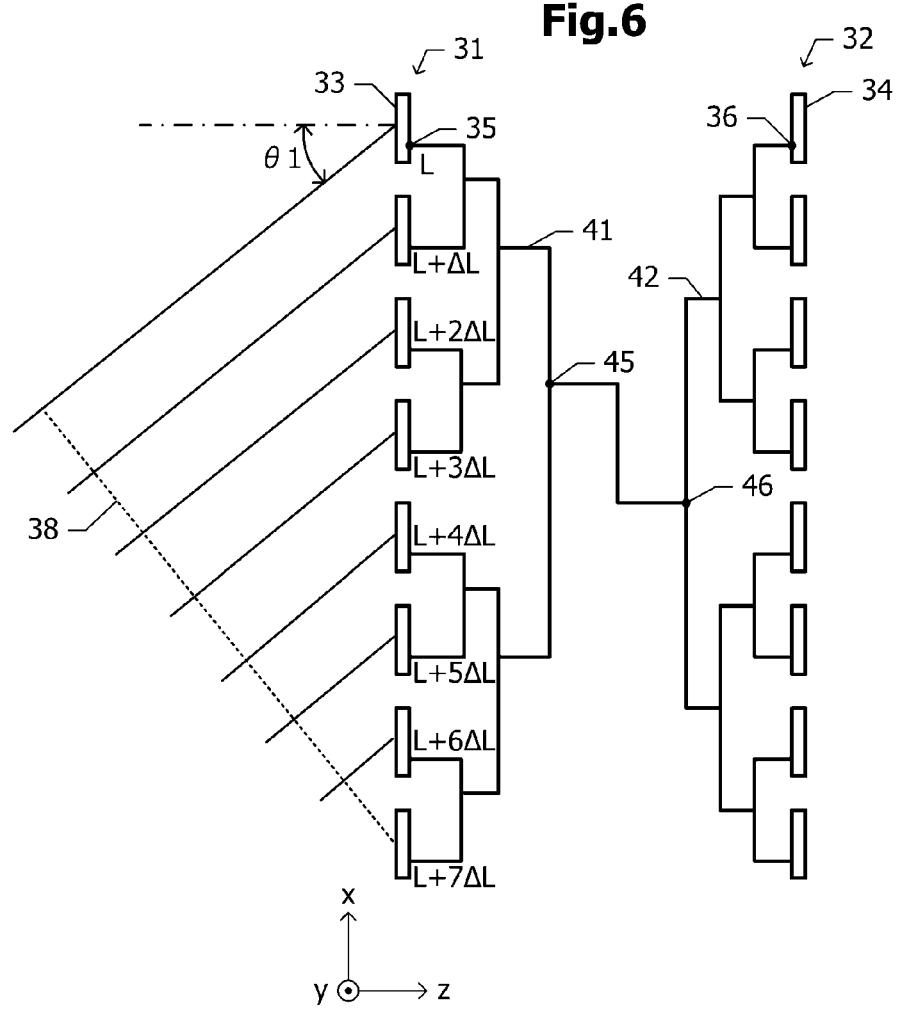

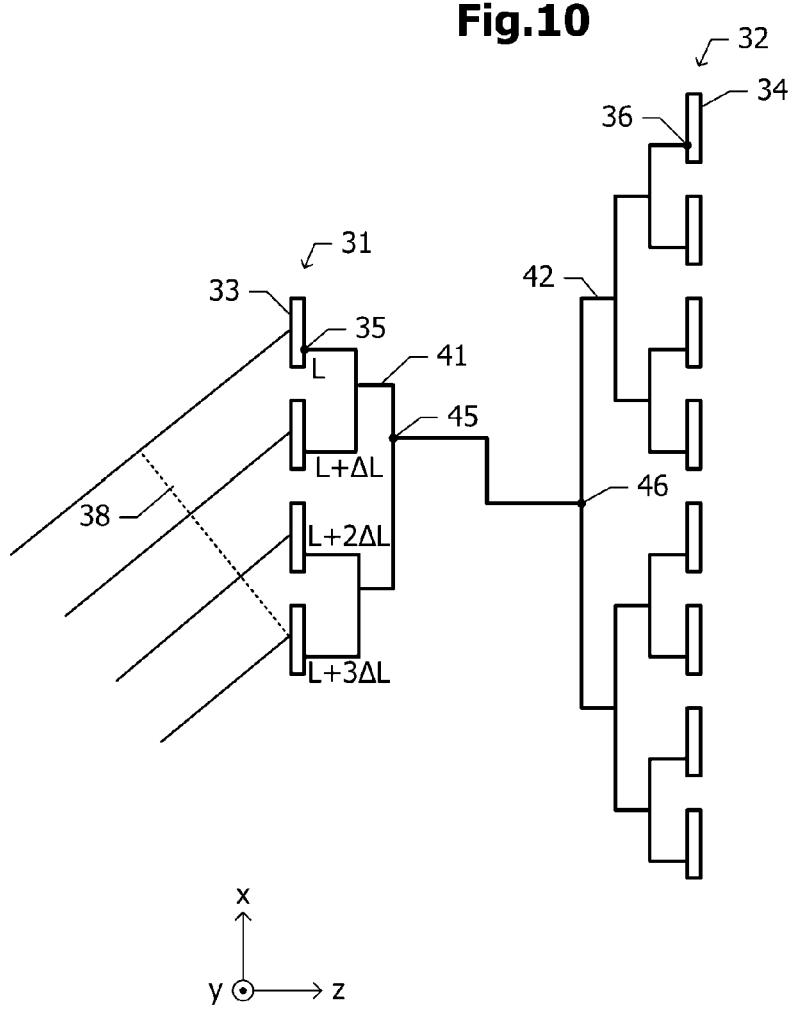

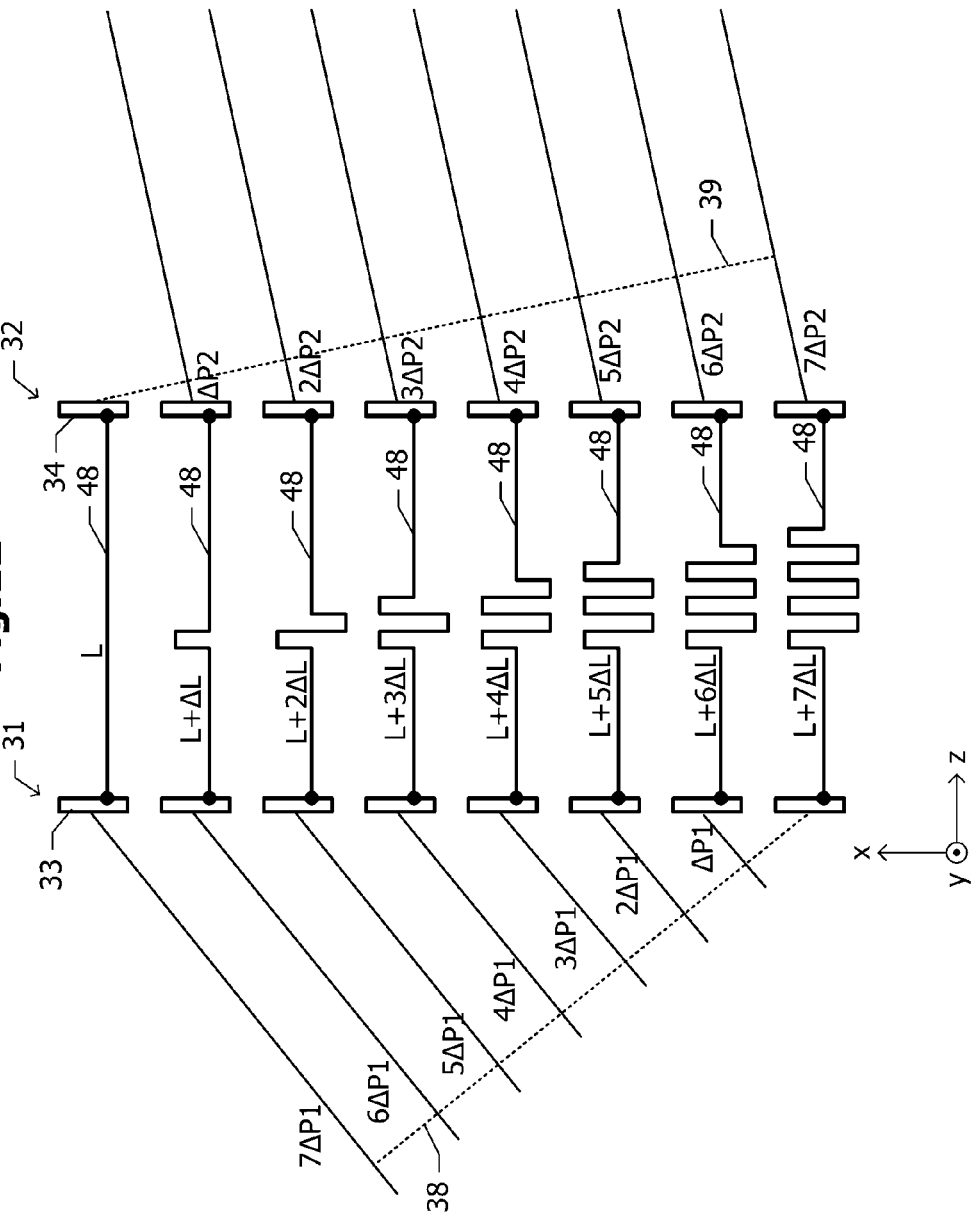

RADIO WAVE REPEATER AND COMMUNICATION SYSTEM

CROSS REFERENCE TO RELATED APPLICATION

This is a continuation of International Application No. PCT/JP2019/042017 filed on Oct. 25, 2019 which claims priority from Japanese Patent Application No. 2018-205585 filed on Oct. 31, 2018. The contents of these applications are incorporated herein by reference in their entireties.

BACKGROUND

Technical Field

The present disclosure relates to a radio wave repeater and a communication system.

A community reception facility in which a community antenna that receives radio waves for satellite broadcasting is installed on the rooftop of a multi-unit dwelling, such as an apartment and signals received at the antenna are distributed to individual dwelling units may be used. A millimeter wave communication system that distributes signals received at a community antenna to individual dwelling units is described in Patent Document 1 mentioned below.

The millimeter wave communication system described in Patent Document 1 receives, at millimeter wave receivers installed on balconies of individual dwelling units, radio waves from a millimeter wave transmitter installed on the rooftop of a multi-unit dwelling. The millimeter wave receivers are connected to tuners provided inside the dwelling units.

Patent Document 1: Japanese Unexamined Patent Application Publication No. 2004-357196

BRIEF SUMMARY

For the millimeter wave communication system disclosed in Patent Document 1, a hole through which a cable passes needs to be drilled in an outer wall so that a receiver installed on a balcony is connected to a tuner installed indoors. The present disclosure provides a radio wave repeater and a communication system that are capable of transmission and reception of signals between inside and outside of a building without necessarily requiring a hole to be drilled in an outer wall of the building.

According to an aspect of the present disclosure,
a radio wave repeater is provided which includes
a first antenna that is provided on a first surface of a support, the support having the first surface and a second surface, directions of normal vectors pointing outside the first surface and the second surface being different from each other,
a second antenna that is provided on the second surface of the support, and
a transmission line through which a radio frequency signal received at the first antenna is transmitted to the second antenna and a radio frequency signal received at the second antenna is transmitted to the first antenna,
wherein the first antenna, the second antenna, and the transmission line are configured such that directivity of the first antenna is different from directivity of the second antenna.

According to another aspect of the present disclosure,
a communication system is provided which includes
an indoor antenna that is installed inside a building and connected to a communication apparatus arranged inside the building, and
a radio wave repeater that is installed outside the building, the radio wave repeater receiving radio waves radiated from the indoor antenna and radiating the received radio waves outside the building or receiving radio waves coming from outside the building and radiating the received radio waves towards the indoor antenna,
wherein the radio wave repeater includes
a first antenna that is provided on a first surface of a support having a plate shape, the first surface being one surface of the support,
a second antenna that is provided on a second surface of the support, the second surface being opposite the first surface, and
a transmission line through which a radio frequency signal received at the first antenna is transmitted to the second antenna and a radio frequency signal received at the second antenna is transmitted to the first antenna, and
wherein the first antenna, the second antenna, and the transmission line are configured such that directivity of the first antenna is different from directivity of the second antenna, the first antenna receives radio waves coming from outside the building and radiates the radio waves outside the building, and the second antenna transmits and receives radio waves to and from the indoor antenna.

By installing a radio wave repeater such that a first antenna receives radio waves coming from outside a building and a second antenna radiates radio waves inside the building, communication can be performed between inside and outside of the building without necessarily requiring a hole to be drilled in an outer wall of the building. Compared to a case where the directivity of the first antenna that is directed outside the building and the directivity of the second antenna that is directed inside the building are the same, flexibility according to radio wave environment can be achieved.

BRIEF DESCRIPTION OF THE SEVERAL VIEWS OF THE DRAWINGS

FIG. 2 is a schematic diagram illustrating a configuration of connection between patches of a first antenna and patches of a second antenna in the first embodiment.

FIG. 6 is a schematic diagram illustrating a configuration of connection between patches of a first antenna and patches of a second antenna in the radio wave repeater according to the second embodiment.

FIG. 10 is a schematic diagram illustrating a configuration of connection between patches of a first antenna and patches of a second antenna in a radio wave repeater according to a fourth embodiment.

FIG. 12 is a schematic diagram illustrating a configuration of connection between patches of a first antenna and patches of a second antenna in a radio wave repeater according to a fifth embodiment.

DETAILED DESCRIPTION

First Embodiment

A radio wave repeater and a communication system according to a first embodiment will be described with reference to FIGS. 1A to 3.

Figure 1A:
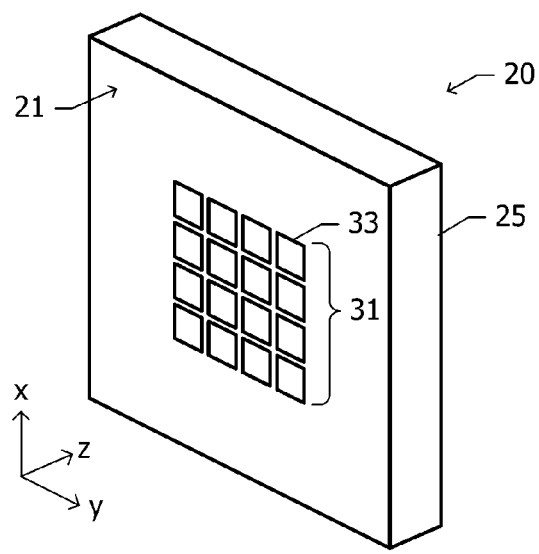
FIGS. 1A and 1B are perspective views of a radio wave repeater according to a first embodiment.
Figure 1B:
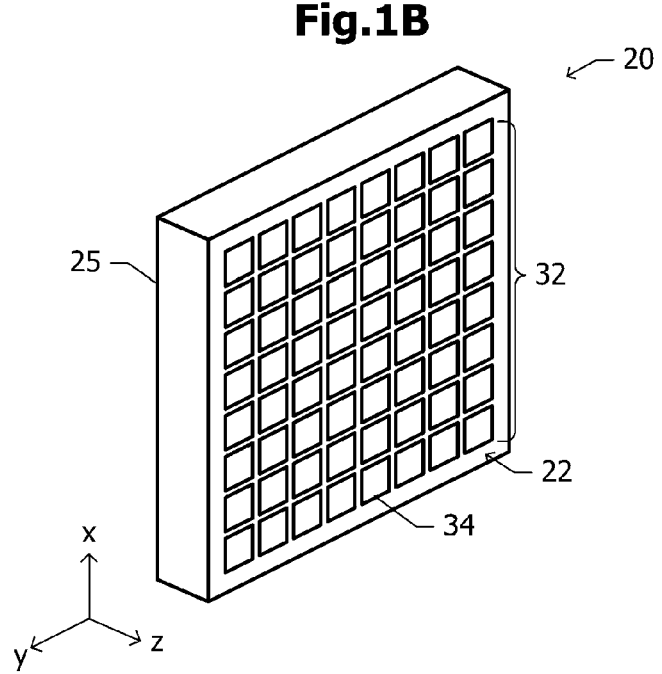

FIGS. 1A and 1B are perspective views of a radio wave repeater 20 according to the first embodiment. The radio wave repeater 20 according to the first embodiment includes a plate-like support 25, a first antenna 31, and a second antenna 32. The first antenna 31 is provided on a first surface 21, which is one surface of the plate-like support 25, and the second antenna 32 is provided on a second surface 22, which is opposite from the first surface 21. For example, a dielectric substrate is used as the support 25.

FIG. 1A is a perspective view of the radio wave repeater 20 when viewed from the first surface 21 side, and FIG. 1B is a perspective view of the radio wave repeater 20 when viewed from the second surface 22 side. An xyz orthogonal coordinate system in which the thickness direction of the support 25 is represented as a z-axis direction is defined. Both the first surface 21 and the second surface 22 are parallel to an x-y plane. A direction from the first surface 21 toward the second surface 22 is defined as a positive z-axis direction. A normal vector pointing outside the first surface 21 and a normal vector pointing outside the second surface 22 are directed opposite to each other. The normal vector pointing outside the first surface 21 is directed towards a negative side of the z-axis, and the normal vector pointing outside the second surface 22 is directed towards a positive side of the z-axis.

Both the first antenna 31 and the second antenna 32 are patch array antennas. The first antenna 31 includes sixteen patches 33 that are arranged in a matrix of four rows and four columns where a y-axis direction is defined as a row direction and an x-axis direction is defined as a column direction. The second antenna 32 includes sixty-four patches 34 that are arranged in a matrix of eight rows and eight columns where the y-axis direction is defined as the row direction and the x-axis direction is defined as the column direction. The resonant frequency of the patches 33 of the first antenna 31 is equal to the resonant frequency of the patches 34 of the second antenna 32. The resonant frequencies of the patches 33 and the patches 34 are not necessarily strictly the same. Even when the resonant frequencies of the patches 33 and the patches 34 are slightly different, sufficient characteristics as the radio wave repeater can be obtained.

A transmission line is provided inside the support 25. The transmission line functions as a waveguide through which a radio frequency signal received at the first antenna 31 is transmitted to the second antenna 32 and a radio frequency signal received at the second antenna 32 is transmitted to the first antenna 31. For example, a strip line is used as the transmission line.

FIG. 2 is a schematic diagram illustrating a configuration of connection between the patches 33 of the first antenna 31 and the patches 34 of the second antenna 32. A plurality of transmission lines 41 branching off from a branch point 45 at one end of a transmission line 40 to form a tournament bracket (system diagram) are connected to power feed points 35 of the plurality of patches 33 of the first antenna 31. In a similar manner, a plurality of transmission lines 42 branching off from the other branch point 46 of the transmission line 40 to form a tournament bracket (system diagram) are connected to power feed points 36 of the plurality of patches 34 of the second antenna 32. The length of the transmission line 40 may be set to zero, and the one branch point 45 may coincide with the other branch point 46.

The power feed points 35 of the plurality of patches 33 of the first antenna 31 are arranged at positions shifted from the centroids of the patches 33 in a negative x-axis direction. In a similar manner, the power feed points 36 of the plurality of patches 34 of the second antenna 32 are arranged at positions shifted from the centroids of the patches 34 in the negative x-axis direction. Thus, E-planes of radio waves radiated from the first antenna 31 and the second antenna 32 are parallel to the x-axis.

The line lengths of the transmission lines 41 from the power feed points 35 of all the plurality of patches 33 to the branch point 45 in the first antenna 31 are the same. In a similar manner, the line lengths of the transmission lines 42 from the power feed points 36 of all the plurality of patches 34 to the branch point 46 in the second antenna 32 are the same.

Next, an operation of the radio wave repeater 20 according to the first embodiment will be described. Because the lengths of the transmission lines 41 from the power feed points 35 of all the plurality of patches 33 to the branch point 45 in the first antenna 31 are the same, all the patches 33 are excited at the same phase. Therefore, a main beam of the first antenna 31 is directed towards the front direction of the first surface 21 (negative z-axis direction) of the support 25 (FIG. 1A). In a similar manner, a main beam of the second antenna 32 is directed towards the front direction of the second surface (positive z-axis direction) of the support 25 (FIG. 1B).

When the first antenna 31 receives radio waves coming from the front direction of the first surface 21 (FIG. 1A), the received radio frequency signal is transmitted through the transmission lines 41, 40, and 42 to the patches 34 of the second antenna 32, and the patches 34 are excited at the same phase. As a result, radio waves are radiated from the second antenna 32 towards the front direction of the second surface 22 (FIG. 1B). In contrast, when the second antenna 32 receives radio waves coming from the front direction of the second surface 22 (FIG. 1B), the radio waves are radiated from the first antenna 31 towards the front direction of the first surface 21 (FIG. 1A).

The number of the patches 34 of the second antenna 32 is greater than the number of the patches 33 of the first antenna 31. Therefore, the directivity of the second antenna 32 is sharper than the directivity of the first antenna 31. In a space towards which the first antenna 31 is directed, a wide range can be covered as a communication possible range. In a space towards which the second antenna 32 is directed, the strength of radio waves radiated towards the front direction of the second surface 22 can be increased, and the reception sensitivity of radio waves coming from the front direction can also be increased. As described above, the directivity of the first antenna 31 is different from the directivity of the second antenna 32.

Figure 3:
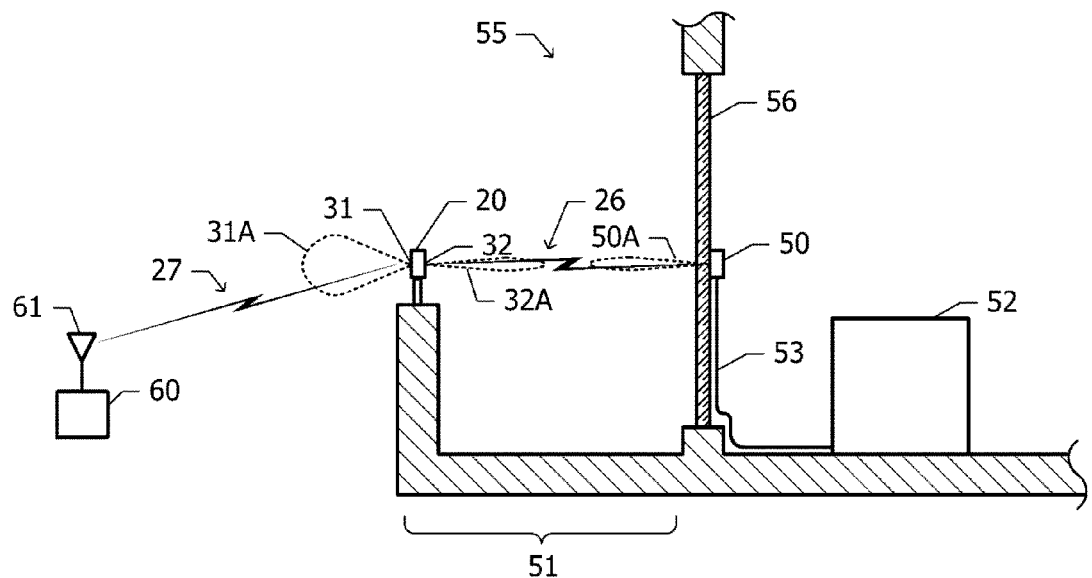
FIG. 3 is a schematic diagram of a communication system according to the first embodiment when viewed in a horizontal direction.

FIG. 3 is a schematic cross-section diagram of a communication system according to the first embodiment. The communication system includes the radio wave repeater 20, an indoor antenna 50, and a wireless transmission node 60. The radio wave repeater 20 according to the first embodiment (FIGS. 1A, 1B, and 2) is used as the radio wave repeater 20. The radio wave repeater 20 is installed outside a building 55, such as an apartment, for example, on a balcony 51, such that the first antenna 31 is directed outside the building 55 and the second antenna 32 is directed inside the building 55. The indoor antenna 50 is installed inside the building 55, for example, on an inside surface of a window pane 56. The second surface 22 (FIG. 1B) of the radio wave repeater 20 faces the indoor antenna 50 with the window pane 56 interposed therebetween.

Image shapes of main beams 31A, 32A, and 50A of the first antenna 31 and the second antenna 32 of the radio wave repeater 20 and the indoor antenna 50, respectively, are indicated by broken lines. The main beam 32A of the second antenna 32 is directed towards the indoor antenna 50, and the main beam 50A of the indoor antenna 50 is directed towards the radio wave repeater 20. Accordingly, a wireless transmission path 26 is established between the second antenna 32 and the indoor antenna 50. The indoor antenna 50 is connected to an indoor communication apparatus 52 by a cable 53.

The wireless transmission node 60 is installed outside the building 55. A transmission and reception antenna 61 for the wireless transmission node 60 is arranged within a radio wave transmission and reception possible range of the first antenna 31 of the radio wave repeater 20. Accordingly, a wireless transmission path 27 is established between the wireless transmission node 60 outside the building 55 and the first antenna 31.

Next, an excellent effect of the first embodiment will be described. In the first embodiment, the wireless transmission path 26 is established between the radio wave repeater 20 and the indoor antenna 50. Thus, communication between the communication apparatus 52 and the wireless transmission node 60, which is installed outdoors, can be performed without necessarily requiring a hole through which a cable passes to be drilled in the outer wall of the building 55. In the radio wave repeater 20, the angle of the main beam 31A of the first antenna 31 is wider than the angle of the main beam 32A of the second antenna 32. Therefore, even in the case where a plurality of wireless transmission nodes 60 are distributed over a wide range, the plurality of wireless transmission nodes 60 may be arranged to fall within a communication possible range. In contrast, due to the sharp directivity of the second antenna 32, the gain of the second antenna 32 can be increased.

Furthermore, in the first embodiment, patch array antennas are used as the first antenna 31 and the second antenna 32. The directivity of a patch antenna is strong in the front direction and leakage of radio waves to the rear side is small. Therefore, interference between the first antenna 31 and the second antenna 32 can be reduced.

Next, a modification of the first embodiment will be described.

In the first embodiment, a patch array antenna of four rows and four columns is used as the first antenna 31, and a patch array antenna of eight rows and eight columns is used as the second antenna 32. However, the arrangement of patches is not limited to four rows and four columns or eight rows and eight columns. For example, arrangement, such as two rows and two columns, three rows and three columns, or the like may be used. However, it is desirable that the number of the patches 34 of the second antenna 32 (FIG. 1B) be greater than the number of the patches 33 of the first antenna 31 (FIG. 1A) so that the directivity of the second antenna 32 is sharper than the directivity of the first antenna 31.

Furthermore, in the first embodiment, patch array antennas are used as the first antenna 31 and the second antenna 32. However, other types of array antennas may be used as the first antenna 31 and the second antenna 32. For example, an array antenna in which a plurality of monopole antennas are arranged in a matrix shape may be used.

Figure 4:
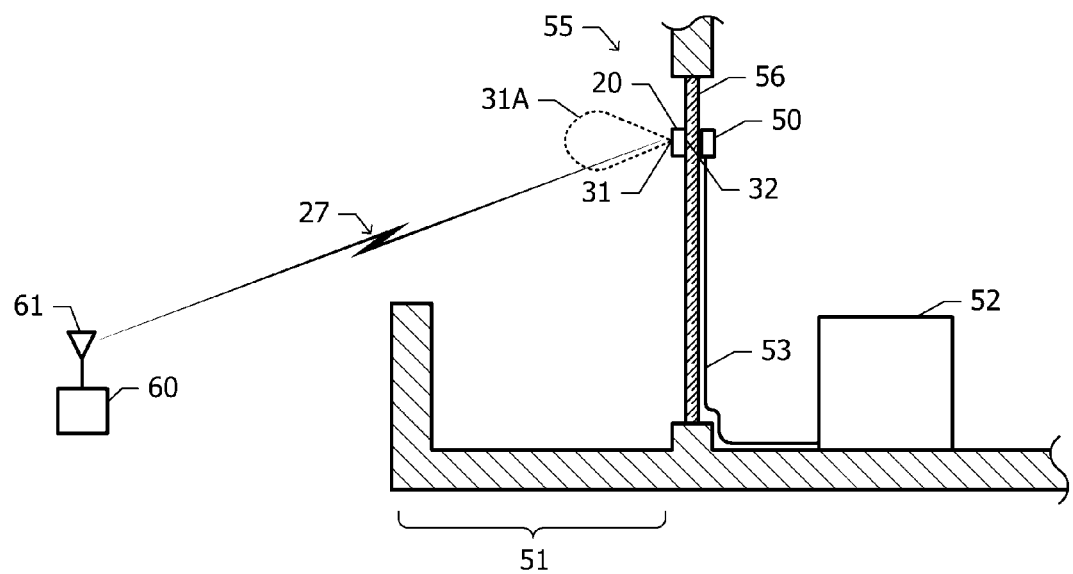
FIG. 4 is a schematic diagram of a communication system according to a modification of the first embodiment when viewed in a horizontal direction.

FIG. 4 is a schematic cross-section diagram of a communication system according to a modification of the first embodiment. In this modification, the indoor antenna 50 is mounted on an inside surface of the window pane 56, and the radio wave repeater 20 is mounted on an outside surface of the window pane 56 such that the second surface 22 of the radio wave repeater 20 (FIG. 1B) faces the outside surface of the window pane 56. In this state, the second surface 22 of the radio wave repeater 20 and the indoor antenna 50 face each other with the window pane 56 interposed therebetween.

In this modification, due to a short distance between the second antenna 32 of the radio wave repeater 20 and the indoor antenna 50, attenuation of radio waves transmitted and received between the second antenna 32 and the indoor antenna 50 can be reduced.

Second Embodiment

Next, a radio wave repeater and a communication system according to a second embodiment will be described with references to FIGS. 5A to 7B. Hereinafter, explanation for the same configurations as those of the radio wave repeater 20 (FIGS. 1A, 1B, and 2) and the communication system (FIG. 3) according to the first embodiment will be omitted.

Figure 5A:
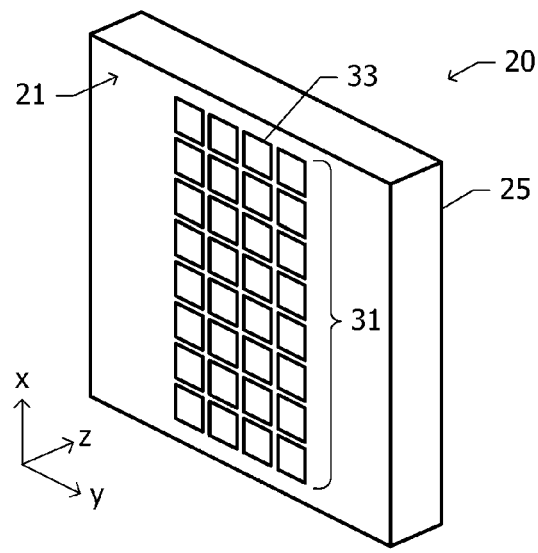
FIG. 5A is a perspective view of a radio wave repeater according to a second embodiment when viewed from a first surface side.
Figure 5B:
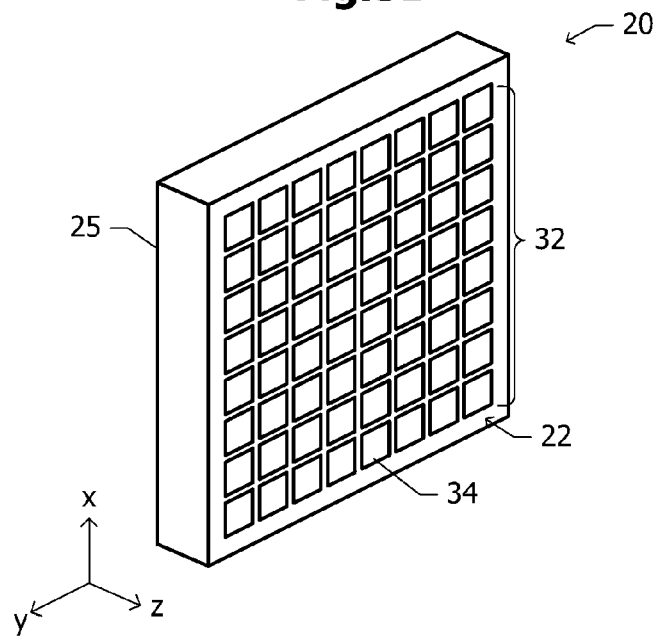
FIG. 5B is a perspective view of the radio wave repeater according to the second embodiment when viewed from a second surface side.

FIG. 5A is a perspective view of the radio wave repeater 20 according to the second embodiment when viewed from the first surface 21 side, and FIG. 5B is a perspective view of the radio wave repeater 20 according to the second embodiment when viewed from the second surface 22 side. The first antenna 31 (FIG. 5A) is provided on the first surface 21 of the support 25, and the second antenna 32 (FIG. 5B) is provided on the second surface 22. In the first embodiment, the plurality of patches 33 of the first antenna 31 (FIG. 1A) are arranged in four rows and four columns. In the second embodiment, however, the plurality of patches 33 of the first antenna 31 are arranged in eight rows and four columns. The configuration of the second antenna 32 is the same as the configuration of the second antenna 32 of the radio wave repeater 20 (FIG. 1B) according to the first embodiment.

FIG. 6 is a schematic diagram illustrating a configuration of connection between the patches 33 of the first antenna 31 and the patches 34 of the second antenna 32 in the radio wave repeater 20 according to the second embodiment. In FIG. 6, eight patches 33 in a column of the first antenna 31 and eight patches 34 in a column of the second antenna 32 are illustrated. In the first embodiment, the line lengths of the transmission lines 41 from the branch point 45 to the power feed points 35 of all the plurality of patches 33 of the first antenna 31 are the same, as illustrated in FIG. 2.

In contrast, in the second embodiment, the line lengths of the transmission lines 41 from the branch point 45 to the power feed points 35 of the plurality of patches 33 of the first antenna 31 are different for individual rows of the patches 33. For example, when a row of a patch 33 is shifted by one row from the positive x-axis side towards the negative x-axis side, the line length of the transmission line 41 increases by ΔL. The line lengths of the transmission lines 41 for the plurality of patches 33 in the same row are the same. The line lengths of the transmission lines 42 from the branch point 46 to the power feed points 36 of all the plurality of patches 34 of the second antenna 32 are the same.

In the second embodiment, as described above, there are differences in the line lengths of the transmission lines 41 among the plurality of patches 33 arranged in the column direction of the first antenna 31. Therefore, an equiphase surface 38 of radio waves radiated from the first antenna 31 is tilted in the x-axis direction relative to the x-y plane. As a result, the direction of a main beam of the first antenna 31 is tilted from the front direction (negative z-axis direction) towards the negative x-axis direction. The tilt angle θ1 is dependent on the difference ΔL of the line length of the transmission line 41. A main beam of the second antenna 32 is directed towards the front direction (positive z-axis direction), as in the first embodiment.

Figure 7A:
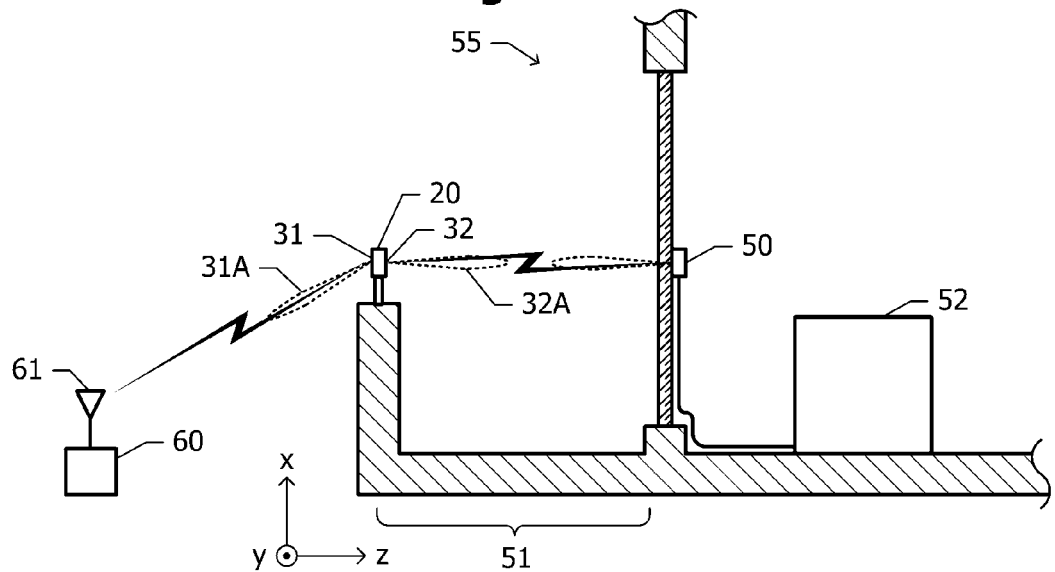
FIGS. 7A and 7B are schematic diagrams of a communication system according to the second embodiment when viewed in a horizontal direction and when viewed from above, respectively.
Figure 7B:
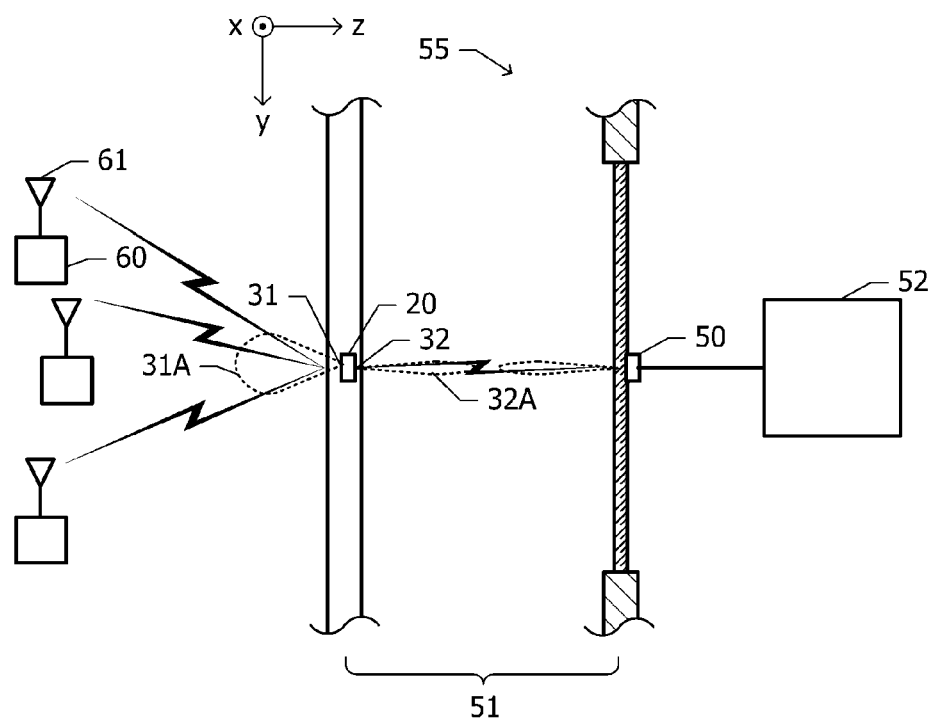

FIGS. 7A and 7B are schematic diagrams of the communication system according to the second embodiment when viewed in the horizontal direction and when viewed from above, respectively. As in the first embodiment, the radio wave repeater 20 is installed on the balcony 51 of the building 55. The radio wave repeater 20 is mounted such that the positive x-axis direction (column direction of the patches 33 (FIG. 5A)) is equal to the upward vertical direction.

The plurality of patches 33 of the first antenna 31 (FIG. 5A) are arranged in four columns, as in the first embodiment. Thus, the angle of the main beam 31A of the first antenna 31 (FIG. 7B) is wide in the horizontal direction. Regarding the plurality of patches 33 of the first antenna 31 (FIG. 1A), eight patches are arranged in the x-axis direction. Thus, the first antenna 31 has a sharp directivity in the vertical direction. That is, the spread of the main beam 31A of the first antenna 31 (FIG. 7A) is narrow in the vertical direction. Furthermore, the main beam 31A is tilted downwards (negative x-axis direction) relative to the horizontal direction.

Next, an excellent effect of the second embodiment will be described. In the second embodiment, communication between the communication apparatus 52, which is installed indoors, and the wireless transmission node 60, which is installed outdoors, can be performed without necessarily requiring a hole to be drilled in the outer wall of the building 55, as in the first embodiment. The main beam 31A of the first antenna 31 can cover a wide range in the horizontal direction, as in the first embodiment. Furthermore, because the main beam 31A is sharp in the vertical direction, the gain of the first antenna 31 can further be increased compared to the first embodiment.

The radio wave repeater 20 according to the second embodiment is effective for a case where the transmission and reception antenna 61 for the wireless transmission node 60 is installed at a position lower than the position of the radio wave repeater 20. For example, the radio wave repeater 20 according to the second embodiment may be installed on the balcony 51 of a high floor of an apartment.

Third Embodiment

Next, a radio wave repeater and a communication system according to a third embodiment will be described with reference to FIGS. 8A to 9B. Hereinafter, explanation for the same configurations as those of the radio wave repeater 20 and the communication system according to the second embodiment (FIGS. 5A to 7B) will be omitted.

Figure 8A:
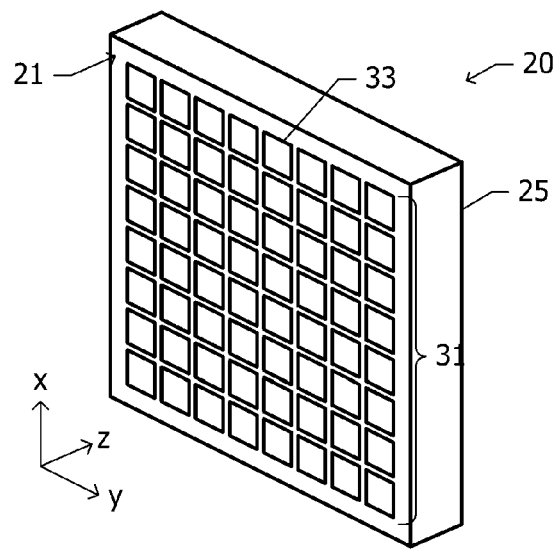
FIG. 8A is a perspective view of a radio wave repeater according to a third embodiment when viewed from a first surface side.
Figure 8B:
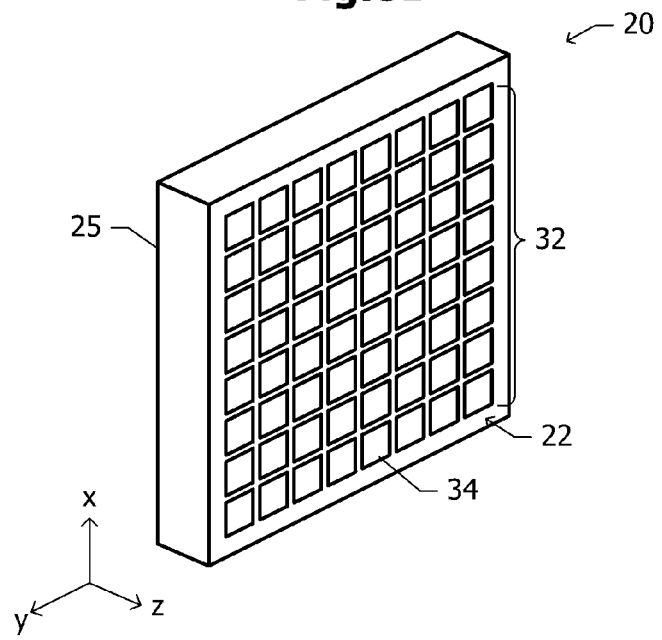
FIG. 8B is a perspective view of the radio wave repeater according to the third embodiment when viewed from a second surface side.

FIG. 8A is a perspective view of the radio wave repeater 20 according to the third embodiment when viewed from the first surface 21 side, and FIG. 8B is a perspective view of the radio wave repeater 20 according to the third embodiment when viewed from the second surface 22 side. In the second embodiment, the plurality of patches 33 of the first antenna 31 (FIG. 5A) are arranged in eight rows and four columns. In contrast, in the third embodiment, the plurality of patches 33 of the first antenna 31 are arranged in eight rows and eight columns. The configuration of the second antenna 32 is the same as the configuration of the second antenna 32 according to the second embodiment.

In the third embodiment, the directivity of the first antenna 31 is sharp both in the x-axis direction (vertical direction) and the y-axis direction (horizontal direction). In the second embodiment, there are differences in the line lengths of the transmission lines 41 among the plurality of patches 33 arranged in the x-axis direction (FIG. 6), and the line lengths of the transmission lines 41 for all the plurality of patches 33 arranged in the y-axis direction (FIG. 6) are the same. In contrast, in the third embodiment, there are differences in the line lengths of the transmission lines 41 among the plurality of patches 33 arranged in the x-axis direction (FIG. 6), and there are also differences in the line lengths of the transmission lines 41 among the plurality of patches 33 arranged in the y-axis direction (FIG. 6). Therefore, a main beam of the first antenna 31 is tilted both in the x-axis direction and the y-axis direction from the front direction.

Figure 9A:
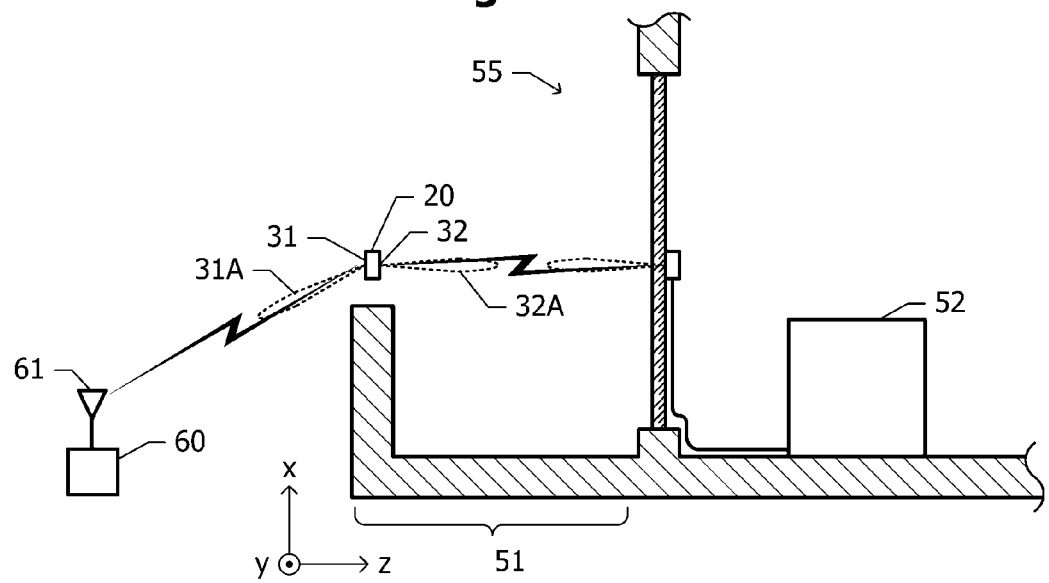
FIGS. 9A and 9B are schematic diagrams of a communication system according to the third embodiment when viewed in a horizontal direction and when viewed from above, respectively.
Figure 9B:
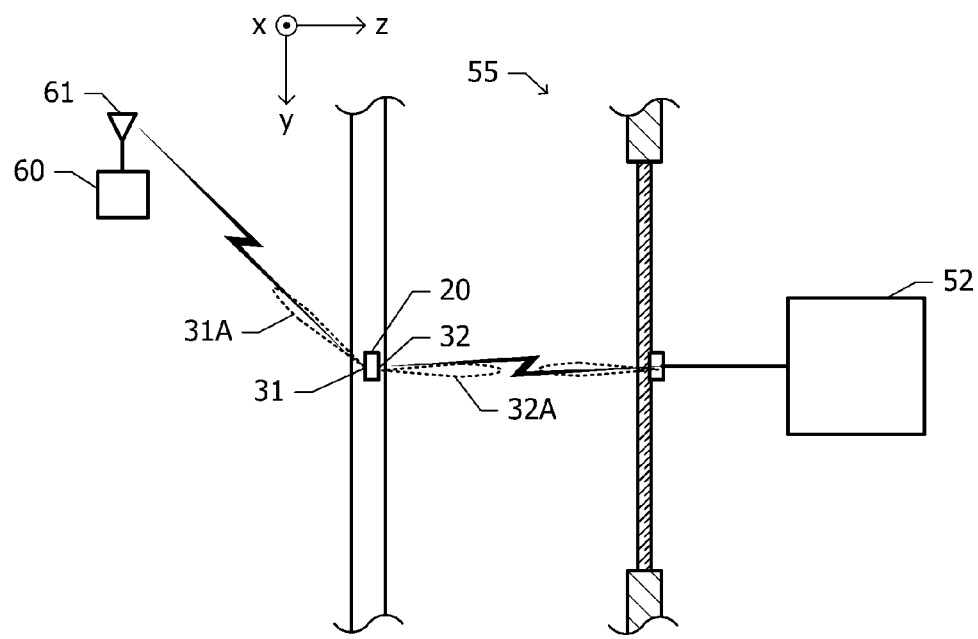

FIGS. 9A and 9B are schematic diagrams of the communication system according to the third embodiment when viewed in the horizontal direction and when viewed from above, respectively. The shapes of the main beam 31A of the first antenna 31 and the main beam 32A of the second antenna 32 in the vertical direction are the same as those in the second embodiment (FIG. 7A).

In the third embodiment, the main beam 31A of the first antenna 31 (FIG. 9B) is also narrowed in the horizontal direction. Furthermore, the main beam 31A is tilted in the y-axis direction from the front direction of the first antenna 31.

Next, an excellent effect of the third embodiment will be described. In the third embodiment, communication between the communication apparatus 52, which is installed indoors, and the wireless transmission node 60, which is installed outdoors, can be performed without necessarily requiring a hole to be drilled in the outer wall of the building 55, as in the second embodiment. Furthermore, in the third embodiment, the main beam 31A of the first antenna 31 is further narrowed compared to the main beam 31A of the first antenna 31 in the second embodiment (FIGS. 7A and 7B). Therefore, the gain of the first antenna 31 can further be increased.

In the third embodiment, the main beam 31A of the first antenna 31 may be tilted both in the vertical direction and the horizontal direction to be directed towards the transmission and reception antenna 61 for the wireless transmission node 60. For example, a plurality of radio wave repeaters 20 with different tilt angles may be prepared, and a radio wave repeater 20 with an optimal tilt angle may be selected for each position at which the radio wave repeater 20 is installed.

Fourth Embodiment

Next, a radio wave repeater and a communication system according to a fourth embodiment will be described with reference to FIGS. 10 to 11B. Hereinafter, explanation for the same configurations as those of the radio wave repeater 20 (FIGS. 5A, 5B, and 6) and the communication system (FIGS. 7A and 7B) according to the second embodiment will be omitted.

FIG. 10 is a schematic diagram illustrating a configuration of connection between the patches 33 of the first antenna 31 and the patches 34 of the second antenna 32 in the radio wave repeater 20 according to the fourth embodiment. In the second embodiment, the plurality of patches 33 of the first antenna 31 (FIG. 5A) are arranged in eight rows and four columns. In the fourth embodiment, however, the plurality of patches 33 of the first antenna 31 are arranged in four rows and four columns. In FIG. 10, four patches 33 in a column of the first antenna 31 and eight patches 34 in a column of the second antenna 32 are illustrated.

The line lengths of the transmission lines 41 from the branch point 45 to the power feed points 35 of the plurality of patches 33 of the first antenna 31 are different for individual rows of the patches 33. For example, when a row of a patch 33 is shifted by one row from the positive x-axis side towards the negative x-axis side, the line length of the transmission line 41 increases by ΔL. Thus, the equiphase surface 38 of radio waves radiated from the first antenna 31 is tilted in the x-axis direction relative to the x-y plane. As a result, a main beam of the first antenna 31 is tilted from the front direction towards the negative x-axis direction.

Figure 11A:
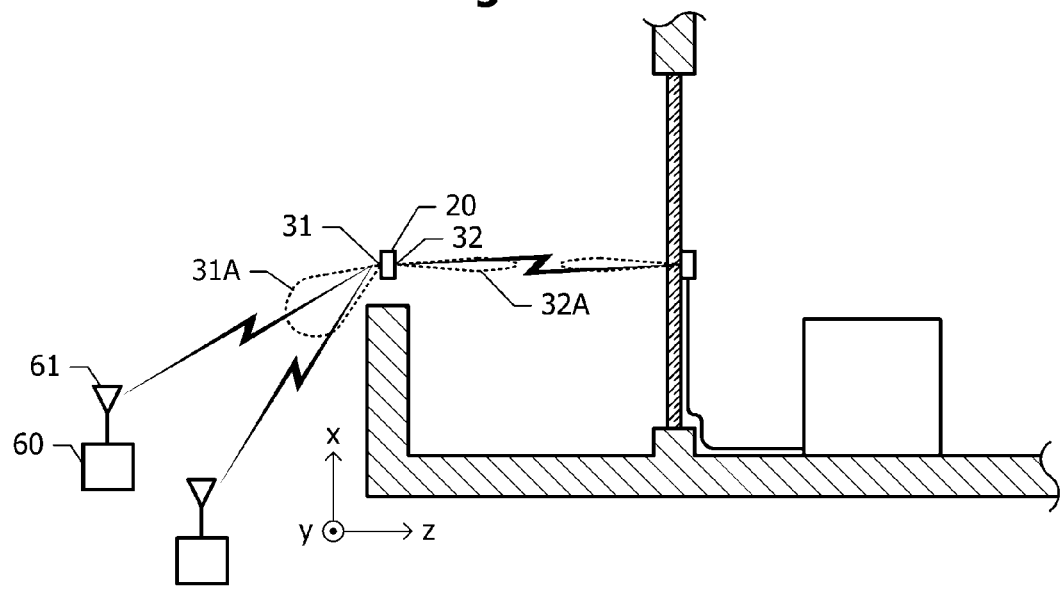
FIGS. 11A and 11B are schematic diagrams of a communication system according to the fourth embodiment when viewed in a horizontal direction and when viewed from above, respectively.
Figure 11B:
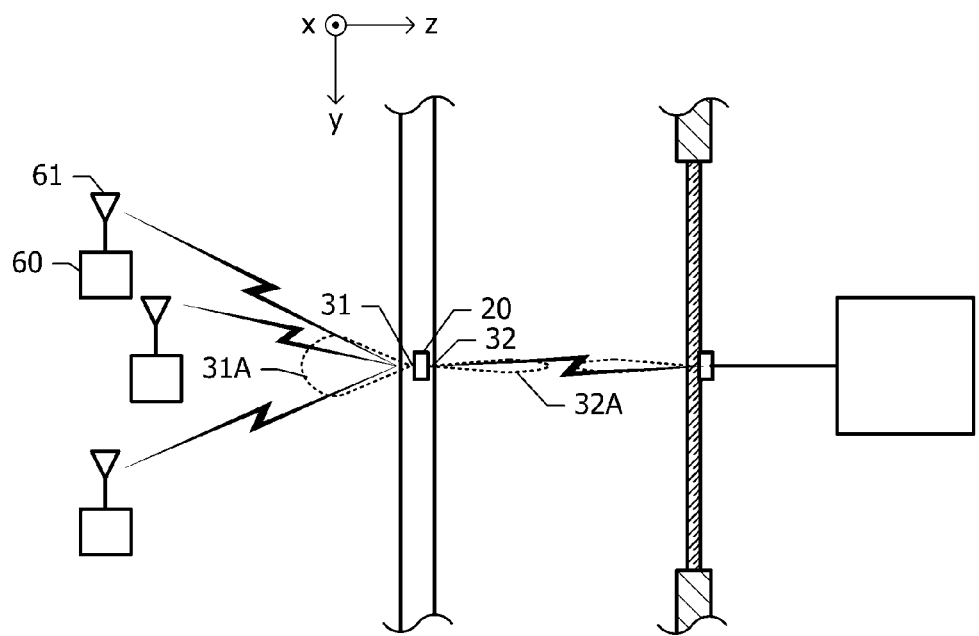

FIGS. 11A and 11B are schematic diagrams of the communication system according to the fourth embodiment when viewed in the horizontal direction and when viewed from above, respectively. The angle of the main beam 31A of the first antenna 31 is wider than the angle of the main beam 32A of the second antenna 32. The main beam 31A of the first antenna 31 (FIG. 11A) is tilted downwards (negative x-axis direction) from the front direction of the first antenna 31.

Next, an excellent effect of the fourth embodiment will be described. In the fourth embodiment, the first antenna 31 covers a wide range in the horizontal direction, as in the second embodiment (FIG. 7B). The first antenna 31 is able to cover a wide range in the vertical direction compared to the case of the second embodiment (FIG. 7A). It is desirable that the radio wave repeater 20 according to the fourth embodiment be used in the case where a plurality of wireless transmission nodes 60 are distributed in the vertical direction.

Fifth Embodiment

Next, the radio wave repeater 20 according to a fifth embodiment will be described with reference to FIG. 12. Hereinafter, explanation for the same configuration as that of the radio wave repeater 20 according to the first embodiment (FIGS. 1A, 1B, and 2) will be omitted.

FIG. 12 is a schematic diagram illustrating a configuration of connection between the patches 33 of the first antenna 31 and the patches 34 of the second antenna 32 in the radio wave repeater 20 according to the fifth embodiment. In the first embodiment, the plurality of patches 33 of the first antenna 31 (FIG. 1A) are arranged in four rows and four columns. In the fifth embodiment, however, the plurality of patches 33 of the first antenna 31 (FIG. 1A) are arranged in eight rows and eight columns. In a similar manner, the patches 34 of the second antenna 32 are arranged in eight rows and eight columns. In FIG. 12, eight patches 33 in a column of the first antenna 31 and eight patches 34 in a column of the second antenna 32 are illustrated.

In the first embodiment, the plurality of transmission lines 41 branching off from the transmission line 40 (FIG. 2) are connected to the patches 33 of the first antenna 31, and the plurality of transmission lines 42 branching off from the transmission line 40 (FIG. 2) are connected to the patches 34 of the second antenna 32. In contrast, in the fifth embodiment, the patches 33 of the first antenna 31 and the patches 34 of the second antenna 32 correspond to each other on a one-to-one basis, and a transmission line 48 is provided for each pair of patches 33 and 34. That is, a transmission line 48 connects a patch 33 and a patch 34.

The line length of a transmission line 48 increases by ΔL with every shift of the column direction (x-axis direction) towards the negative x-axis direction by one row. The line lengths of the transmission lines 48 for pairs of the patches 33 and 34 in the same row are the same.

Next, an operation of the radio wave repeater 20 according to the fifth embodiment will be described. When radio waves coming from a direction tilted in the x-axis direction relative to the front direction reach the first antenna 31, radio frequency current is generated in the plurality of patches 33. The equiphase surface 38 of arriving radio waves is indicated by a broken line. A phase difference ΔP1 occurs between radio frequency currents generated in patches 33 that are adjacent to each other in the x-axis direction. The radio frequency currents having the phase difference ΔP1 pass through the transmission lines 48 with different line lengths and are transmitted to the patches 34 of the second antenna 32, and radio frequency currents are generated in the patches 34 of the second antenna 32.

In the radio frequency currents generated in the patches 34 of the second antenna 32, a phase difference ΔP2, which is obtained by adding or subtracting a phase difference dependent on the phase difference ΔL of line lengths of the transmission lines 48 to or from the phase difference ΔP1 of radio frequency currents generated in the plurality of patches 33 of the first antenna 31, is generated. Radio waves are radiated from the second antenna 32 in a direction based on the phase difference ΔP2. An equiphase surface 39 of radio waves radiated from the second antenna 32 is indicated by a broken line. In a similar manner, in the case where radio waves are incident to the second antenna 32, radio waves are radiated from the first antenna 31 in a direction determined in accordance with the direction in which radio waves reach and the difference ΔL of line lengths of the transmission lines 48.

In the first embodiment, directions of the main beam 31A of the first antenna 31 and the main beam 32A of the second antenna 32 (FIG. 3) are fixed. In contrast, in the radio wave repeater 20 according to the fifth embodiment, a direction in which waves reaching one of the first antenna 31 and the second antenna 32 propagates is changed, and radio waves are radiated from the other one of the first antenna 31 and the second antenna 32. As described above, the angle formed between a direction in which emission energy of the first antenna 31 is maximum and a normal of the first surface 21 is different from the angle formed between a direction in which emission energy of the second antenna 32 is maximum and a normal of the second surface 22. Also in this case, in a broad sense, it can be expressed that the directivity of the first antenna 31 is different from the directivity of the second antenna 32.

Sixth Embodiment

Next, a radio wave repeater according to a sixth embodiment will be described with reference to FIG. 13. Hereinafter, explanation for the same configuration as that of the radio wave repeater 20 according to the first embodiment (FIGS. 1A, 1B, and 2) will be omitted.

Figure 13:
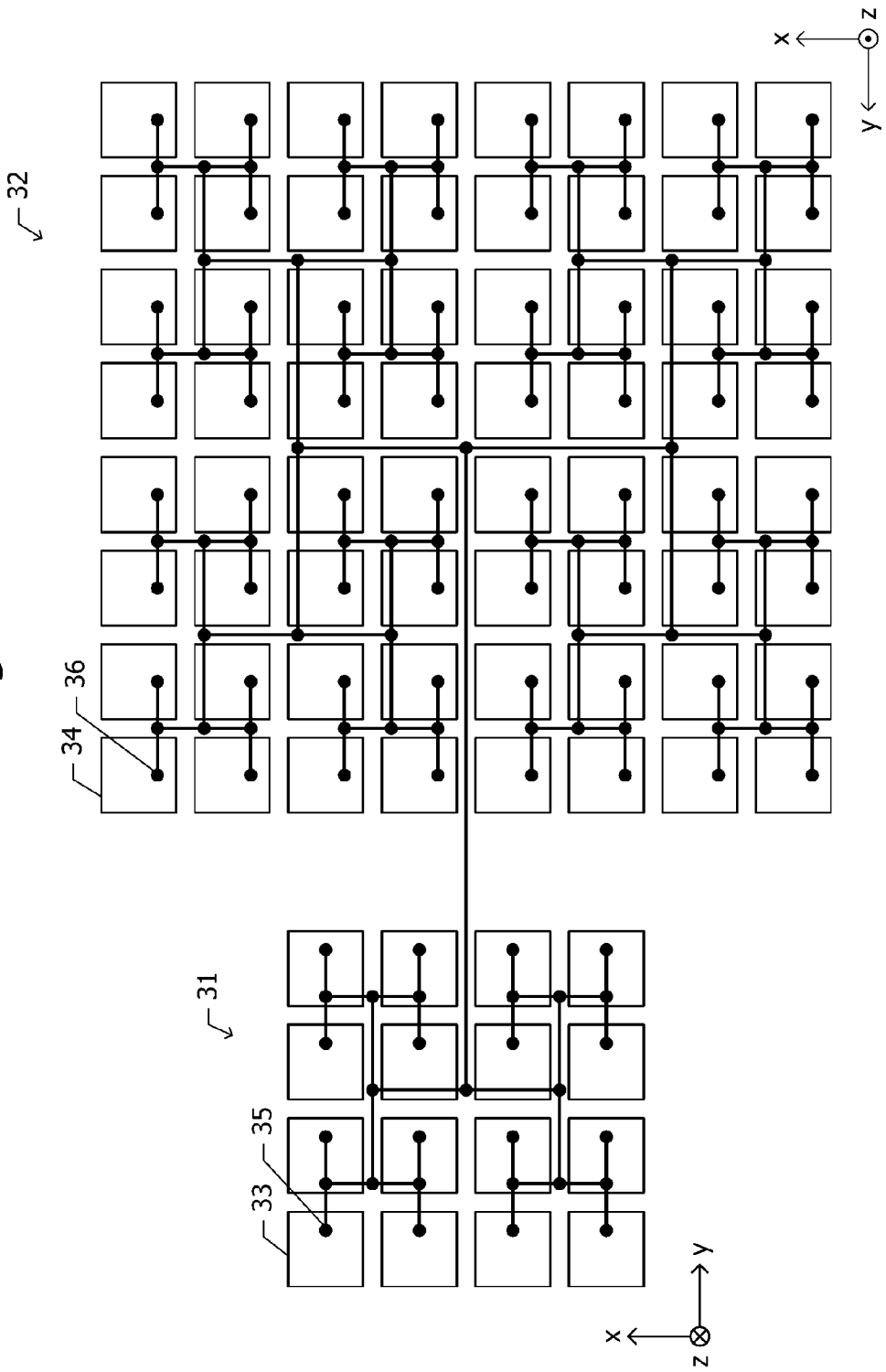
FIG. 13 is a schematic diagram illustrating a configuration of connection between patches of a first antenna and patches of a second antenna in a radio wave repeater according to a sixth embodiment.

FIG. 13 is a schematic diagram illustrating a configuration of connection between the patches 33 of the first antenna 31 and the patches 34 of the second antenna 32 in the radio wave repeater 20 according to the sixth embodiment. In the first embodiment, the power feed points 35 of the patches 33 of the first antenna 31 (FIG. 2) are shifted from the centroids of the patches 33 in the x-axis direction, and the power feed points 36 of the patches 34 of the second antenna 32 (FIG. 2) are also shifted from the centroids of the patches 34 in the x-axis direction. Thus, both an E-plane of radio waves radiated from the first antenna 31 and an E-plane of radio waves radiated from the second antenna 32 are perpendicular to the y-axis.

In contrast, in the sixth embodiment, the power feed points 35 of the patches 33 of the first antenna 31 are shifted from the centroids of the patches 33 in the y-axis direction. Thus, the E-plane of radio waves radiated from the first antenna 31 is perpendicular to the x-axis. Accordingly, the E-plane of radio waves radiated from the first antenna 31 and the E-planes of radio waves radiated from the second antenna 32 are orthogonal to each other.

Next, an excellent effect of the sixth embodiment will be described. In the sixth embodiment, the E-plane of radio waves reaching the radio wave repeater 20 and the E-plane of radio waves radiated from the radio wave repeater 20 are orthogonal to each other. Therefore, interference between them can be reduced.

Next, a modification of the sixth embodiment will be described. In the sixth embodiment, the E-plane of radio waves radiated from the first antenna 31 and the E-plane of radio waves radiated from the second antenna 32 are orthogonal to each other. However, the E-planes need not be parallel to each other. Furthermore, a polarization direction of radio waves radiated from the first antenna 31 and the polarization direction of radio waves radiated from the second antenna 32 may be different from each other. A polarization direction of radio waves radiated from the first antenna 31 and the polarization direction of radio waves radiated from the second antenna 32 need not be parallel to each other. With this configuration, interference between arriving radio waves and radiated radio waves can be reduced, compared to a configuration in which the polarization directions are parallel to each other.

Seventh Embodiment

Next, the radio wave repeater 20 according to a seventh embodiment will be described with reference to FIGS. 14A, 14B, and 14C. Hereinafter, explanation for the same configuration as that of the radio wave repeater 20 according to the first embodiment (FIGS. 1A, 1B, and 2) will be omitted. In the first embedment, the first antenna 31 and the second antenna 32 are configured to be patch array antennas. In the seventh embodiment, however, the first antenna 31 and the second antenna 32 are configured to be slot array antennas.

Figure 14A:
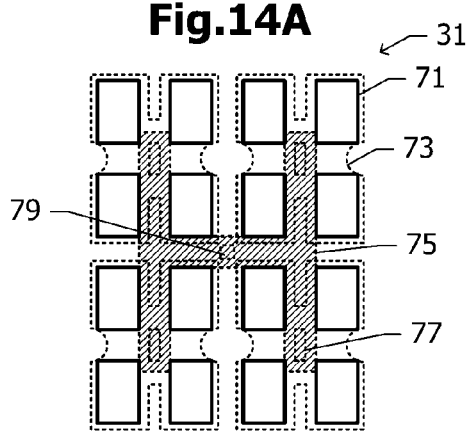
FIGS. 14A and 14B are diagrams illustrating layouts of components when a plate-like support of a radio wave repeater according to a seventh embodiment is viewed from a first surface 21 side and a second surface 22 side, respectively.
Figure 14B:
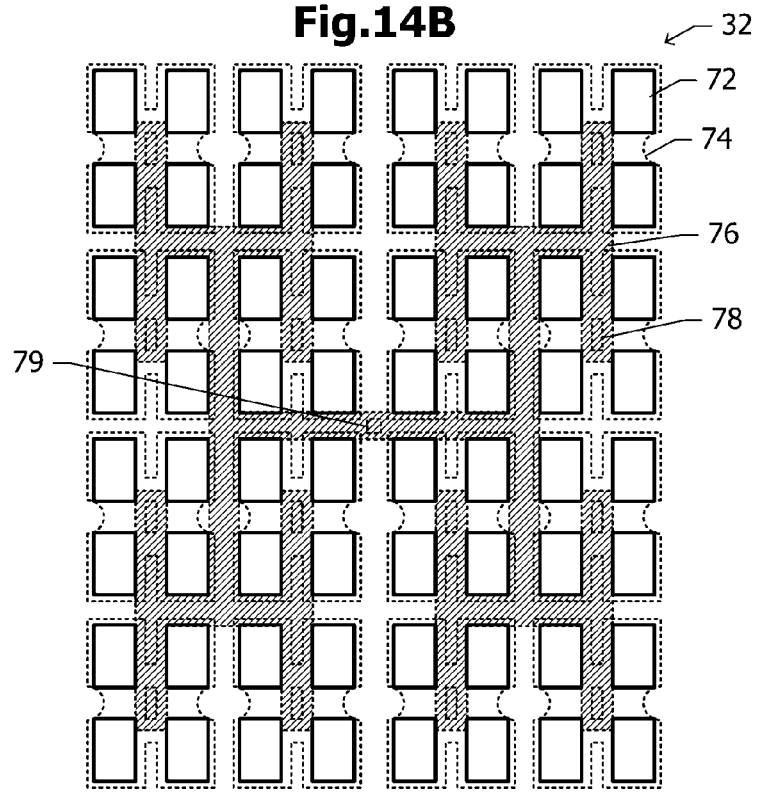
Figure 14C:
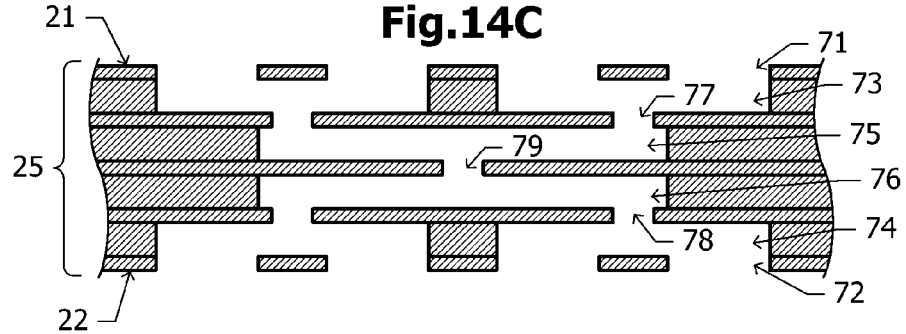
FIG. 14C is a diagram illustrating a cross-section structure of the radio wave repeater according to the seventh embodiment.

FIGS. 14A and 14B are diagrams illustrating layouts of components when the plate-like support 25 of the radio wave repeater 20 according to the seventh embodiment is viewed from the first surface 21 side and the second surface 22 side, respectively. FIG. 14C is a diagram illustrating a cross-section structure of the radio wave repeater 20 according to the seventh embodiment. FIG. 14C is not a cross-section diagram in which the radio wave repeater 20 is cut along a plane but illustrates the positional relationship among components in the thickness direction of the support 25. For example, metal or a composite material formed by metal plating of a resin surface may be used as the support 25.

A plurality of radiation slots 71 (FIGS. 14A and 14C) are arranged in the first surface 21 of the support 25. The plurality of radiation slots 71 are arranged in, for example, a matrix of four rows and four columns. A cavity 73 is provided for four radiation slots 71. A waveguide 75 is provided at a deeper position than the cavity 73. In FIG. 14A, the waveguide 75 is indicated by hatching. The waveguide 75 branches off from a center coupling aperture 79 to form a tournament bracket (system diagram) and is coupled to the cavity 73 via a coupling aperture 77.

A plurality of radiation slots 72 (FIGS. 14B and 14C) are arranged in the second surface 22 of the support 25. The plurality of radiation slots 72 are arranged in, for example, a matrix of eight rows and eight columns. A cavity 74 is provided for four radiation slots 72. A waveguide 76 is provided at a deeper position than the cavity 74. In FIG. 14B, the waveguide 76 is indicated by hatching. The waveguide 76 branches off from the center coupling aperture 79 to form a tournament bracket (system diagram) and is coupled to the cavity 74 via a coupling aperture 78.

The radiation slots 71 and 72 correspond to the patches 33 and 34, respectively, in the first embodiment (FIG. 2). The plurality of radiation slots 71 form the first antenna 31, and the plurality of radiation slots 72 form the second antenna 32. The cavities 73, the waveguides 75, and the coupling apertures 77 correspond to the transmission lines 41 in the first embodiment (FIG. 2). The cavities 74, the waveguides 76, and the coupling apertures 78 correspond to the transmission lines 42 in the first embodiment (FIG. 2). The center coupling aperture 79 corresponds to the transmission line 40 in the first embodiment (FIG. 2). As described above, in the seventh embodiment, waveguides are used as transmission lines connecting the first antenna 31 and the second antenna 32.

In the seventh embodiment, the directivity of the first antenna 31 is different from the directivity of the second antenna 32, as in the first embodiment. Thus, an excellent effect similar to that in the first embodiment can be achieved.

Eighth Embodiment

The radio wave repeater 20 according to an eighth embodiment will be described with reference to FIGS. 15A and 15B. Hereinafter, explanation for the same configuration as that of the radio wave repeater 20 according to the first embodiment (FIGS. 1A, 1B, and 2) will be omitted.

Figure 15A:
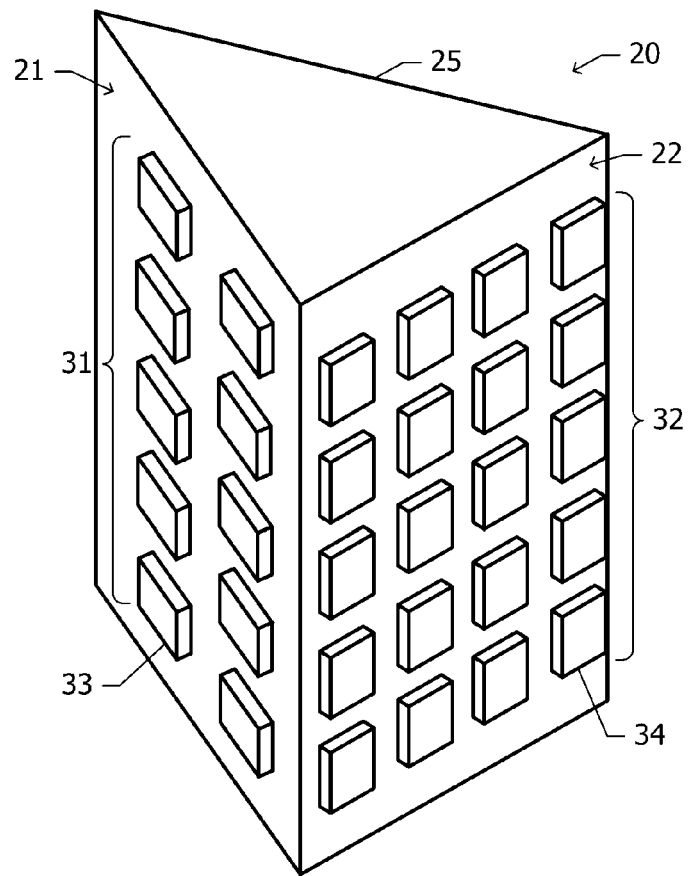
FIGS. 15A and 15B are a perspective view and a plan view, respectively, of a radio wave repeater according to an eighth embodiment.
Figure 15B:
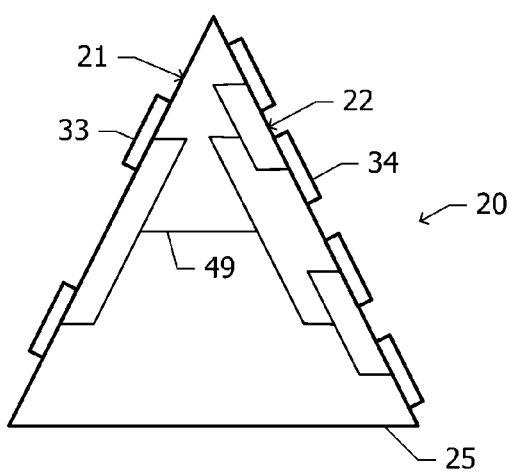

FIGS. 15A and 15B are a perspective view and a plan view, respectively, of the radio wave repeater 20 according to the eighth embodiment. In FIG. 15B, a transmission line 49 is schematically illustrated. In the first embodiment, the support 25 of the radio wave repeater 20 (FIGS. 1A and 1B) has a plate shape. In contrast, in the eighth embodiment, the support 25 has a triangular prism shape. One of the three side faces of the support 25 corresponds to the first surface 21, and another one of the three side faces corresponds to the second surface 22. The angle formed between a normal vector pointing outside the first surface 21 and a normal vector pointing outside the second surface 22 is greater than 0 degrees and smaller than 180 degrees.

The plurality of patches 33 of the first antenna 31 are arranged on the first surface 21, and the plurality of patches 34 of the second antenna 32 are arranged on the second surface 22. The transmission line 49 is provided inside the support 25. The transmission line 49 connects the plurality of patches 33 of the first antenna 31 and the plurality of patches 34 of the second antenna 32. As a mode of connection by the transmission line 49, the same mode of connection as the mode of connection by the transmission lines 40 and 41 of the radio wave repeater 20 according to the first embodiment (FIG. 2) is used. Thus, a main beam of the first antenna 31 is directed towards the normal direction of the first surface 21, and a main beam of the second antenna 32 is directed towards the normal direction of the second surface 22.

Next, an excellent effect of the eighth embodiment will be described. In the eighth embodiment, radio waves received at the first antenna 31 may be radiated from the second antenna 32, whereas radio waves received at the second antenna 32 may be radiated from the first antenna 31, as in the first embodiment. Furthermore, an effect can be obtained that the directivity of the second antenna 32 is sharper than the directivity of the first antenna 31. In the first embodiment, the normal vector pointing outside the first surface 21 and the normal vector pointing outside the second surface 22 are directed opposite to each other. Thus, directions in which relayed radio waves propagate are not changed. In contrast, in the eighth embodiment, the angle formed between the normal vector pointing outside the first surface 21 and the normal vector pointing outside the second surface 22 is less than 180 degrees. Therefore, directions in which relayed radio waves propagate may be different.

Next, a modification of the eighth embodiment will be described. In the eighth embodiment, the support 25 has a triangular prism shape. However, the support 25 may have a different shape. For example, the support 25 may be a hollow triangular cylinder or a polygonal prism, such as a prism with four or more faces or a polygonal cylinder. Furthermore, the support 25 may have an undefined shape with the first surface 21 and the second surface 22 in which the angle formed between normal vectors pointing outside is greater than 0 degrees and smaller than 180 degrees.

Furthermore, in the eighth embodiment, the mode of connection by the transmission line 49 is similar to that in the case of the first embodiment (FIG. 2). However, as the mode of connection by the transmission line 49, the mode of connection in any of the second embodiment (FIG. 6), the fourth embodiment (FIG. 10), and the fifth embodiment (FIG. 12) may be used.

Ninth Embodiment

Next, the radio wave repeater 20 according to a ninth embodiment will be described with reference to FIGS. 16A and 16B. Hereinafter, explanation for the same configuration as that of the radio wave repeater 20 according to the first embodiment (FIGS. 1A and 1B) will be omitted.

Figure 16A:
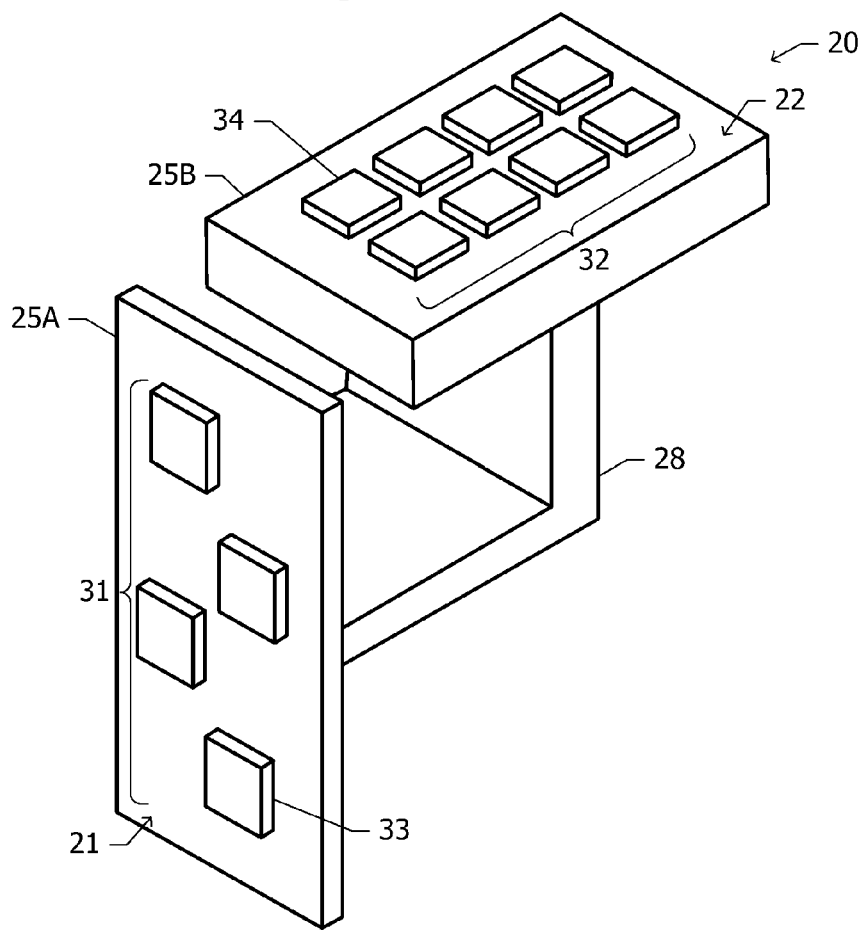
FIGS. 16A and 16B are a perspective view and a side view, respectively, of a radio wave repeater according to a ninth embodiment.
Figure 16B:
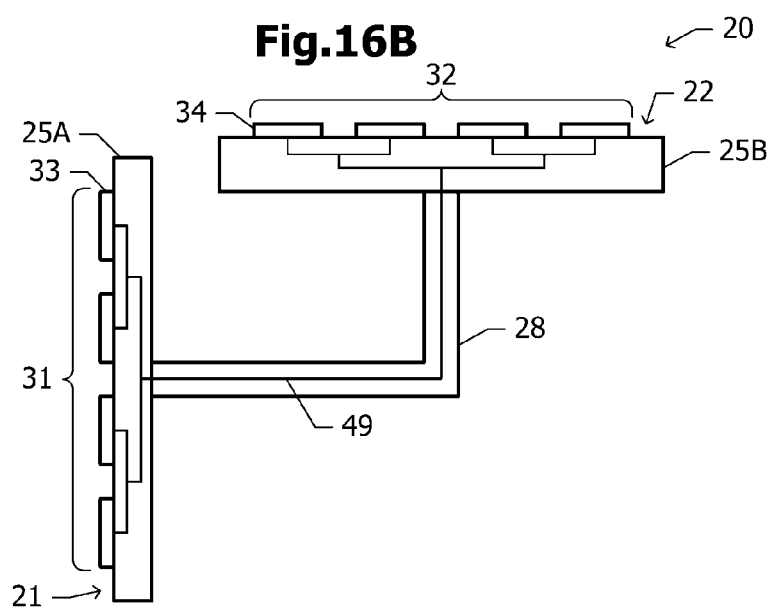

FIGS. 16A and 16B are a perspective view and a side view, respectively, of the radio wave repeater 20 according to the ninth embodiment. In FIG. 16B, the transmission line 49 is schematically illustrated. In the first embodiment, the first antenna 31 is provided on the first surface 21 of the plate-like support 25, and the second antenna 32 is provided on the opposite second surface 22. In contrast, in the ninth embodiment, the plurality of patches 33 of the first antenna 31 are provided on the first surface 21 of a support 25A, and the plurality of patches 34 of the second antenna 32 are provided on the second surface 22 of a support 25B that is different from the support 25A. The angle formed between a normal vector pointing outside the first surface 21 of the support 25A and a normal vector pointing outside the second surface 22 of the support 25B is 90 degrees.

The arrangement and the number of the plurality of patches 33 of the first antenna 31 are different from the arrangement and the number of the plurality of patches 34 of the second antenna 32.

The support 25A and the support 25B are connected by a flexible substrate 28. The plurality of patches 33 of the first antenna 31 and the plurality of patches 34 of the second antenna 32 are connected by the transmission line 49 provided at the flexible substrate 28. The mode of connection by the transmission line 49 is similar to that in the radio wave repeater 20 according to the first embodiment.

A main beam of the first antenna 31 is directed towards the normal direction of the first surface 21, and a main beam of the second antenna 32 is directed towards the normal direction of the second surface 22. That is, directions of the main beams of both the first antenna 31 and the second antenna 32 intersect at right angles.

Next, an excellent effect of the ninth embodiment will be described. In the radio wave repeater 20 according to the ninth embodiment, radio waves received at the first antenna 31 may be polarized and radiated from the second antenna 32, whereas radio waves received at the second antenna 32 may be polarized and radiated from the first antenna 31. The angle of polarization is the right angle. Furthermore, with an antenna that has relatively wide-angle directivity characteristics, transmission and reception of radio waves to and from transmission and reception nodes that are distributed over a wide range can be performed. Furthermore, with an antenna that has relatively sharp directivity characteristics, a high gain can be achieved.

Next, a modification of the ninth embodiment will be described. In the ninth embodiment, the angle formed between the normal vector pointing outside the first surface 21 and the normal vector pointing outside the second surface 22 is the right angle. However, the angle formed between the normal vectors may be other degrees. Furthermore, in the ninth embodiment, the first antenna 31 and the second antenna 32 are configured to be patch array antennas. However, the first antenna 31 and the second antenna 32 may be configured to be slot array antennas, as in the seventh embodiment (FIGS. 14A and 14B). In this case, in place of the flexible substrate 28, a waveguide may connect the supports 25A and 25B.

The forgoing embodiments are mere exemplifications. It is obvious that configurations described in different embodiments may be partially replaced or combined. Similar operations and effects obtained by similar configurations in a plurality of embodiments are not referred to in each of the embodiments. Furthermore, the present disclosure is not intended to be limited to the embodiments described above. For example, it would be obvious to those skilled in the art that various changes, improvements, combinations, and the like are possible.

REFERENCE SIGNS LIST 20 radio wave repeater
21 first surface
22 second surface
25, 25A, 25B support
26, 27 wireless transmission path
28 flexible substrate
31 first antenna
31A main beam of first antenna
32 second antenna
32A main beam of second antenna
33 patch of first antenna
34 patch of second antenna
35, 36, power feed point
38, 39 equiphase surface
40, 41, 42 transmission line
45, 46 branch point
48, 49 transmission line
50 indoor antenna
50A main beam of indoor antenna
51 balcony
52 communication apparatus
53 cable
55 building
56 window pane
60 wireless transmission node
61 transmission and reception antenna
71, 72 radiation slot
73, 74 cavity
75, 76 waveguide
77, 78, 79 coupling aperture

The invention claimed is:

1. A radio wave repeater comprising:
a first antenna that is on a first surface of a support;
a second antenna that is on the second surface of the support, wherein in an XYZ orthogonal coordinate system a direction of a normal vector pointing away from the first surface is different than a direction of a normal vector pointing away from the second surface; and
a transmission line through which a radio frequency signal received at the first antenna is transmitted to the second antenna, and a radio frequency signal received at the second antenna is transmitted to the first antenna,
wherein the first antenna, the second antenna, and the transmission line are configured such that a directivity of the first antenna is different than a directivity of the second antenna,
wherein a direction of polarization of radio waves radiated from the first antenna is different than a direction of polarization of radio waves radiated from the second antenna,
wherein the support is a single structure that is common to the first antenna and the second antenna in the radio wave repeater,
wherein the support has a plate shape,
wherein the direction of the normal vector pointing away from the first surface is toward a negative side of the Z-axis, and the direction of the normal vector pointing away from the second surface is toward a positive side of the Z-axis, the Z-axis being a thickness direction of the support,
wherein the first antenna or the second antenna comprises a plurality of patch antenna elements arranged in an array, and
wherein transmission line lengths for the patch antenna elements increase by a given length between each adjacent row of the array in the negative X-axis.

2. The radio wave repeater according to claim 1, wherein one of the directivity of the first antenna and the directivity of the second antenna is sharper than the other one of the directivity of the first antenna and the directivity of the second antenna.

3. The radio wave repeater according to claim 1, wherein an angle between a direction in which emission energy of the first antenna is maximum and the direction of the normal vector pointing away from the first surface is different than an angle between a direction in which emission energy of the second antenna is maximum and the direction of the normal vector pointing away from the second surface.

4. The radio wave repeater according to claim 1, wherein a direction of polarization of radio waves radiated from the first antenna is not parallel to a direction of polarization of radio waves radiated from the second antenna.

5. The radio wave repeater according to claim 1, wherein an electric field plane (E-plane) of radio waves radiated from the first antenna is orthogonal to an E-plane of radio waves radiated from the second antenna.

6. The radio wave repeater according to claim 1, wherein the first surface and the second surface are opposite each other.

7. The radio wave repeater according to claim 1, wherein an angle between the direction of the normal vector pointing away from the first surface and the direction of the normal vector pointing away from the second surface is greater than 0 degrees and less than 180 degrees.

8. The radio wave repeater according to claim 1, wherein for each row of the array, each patch antenna element in the row has a same transmission line length.

9. A communication system comprising:
an indoor antenna that is installed inside a building and that is connected to a communication apparatus that is inside the building; and
a radio wave repeater that is installed outside the building, the radio wave repeater being configured:
to receive radio waves radiated from the indoor antenna and to radiate the radio waves received from the indoor antenna outside the building, or
to receive radio waves from outside the building and to radiate the radio waves received from outside the building towards the indoor antenna,
wherein the radio wave repeater comprises:
a first antenna that is on a first surface of a support, the support having a plate shape, a second antenna that is on a second surface of the support, the second surface being opposite the first surface, and a transmission line through which a radio frequency signal received at the first antenna is transmitted to the second antenna, and a radio frequency signal received at the second antenna is transmitted to the first antenna, and wherein the first antenna, the second antenna, and the transmission line are configured such that a directivity of the first antenna is different than a directivity of the second antenna, wherein the first antenna is configured to receive the radio waves from outside the building and to radiate the radio waves received from the indoor antenna outside the building, wherein the second antenna is configured to radiate the radio waves received from outside the building toward the indoor antenna and to receive the radio waves radiated from the indoor antenna, and wherein a direction of polarization of radio waves radiated from the first antenna is different than a direction of polarization of radio waves radiated from the second antenna.

10. The communication system according to claim 9, wherein the indoor antenna and the radio wave repeater are mounted on an inside surface and an outside surface, respectively, of a window pane of the building, and wherein the second surface of the radio wave repeater and the indoor antenna face each other with the window pane interposed therebetween.

11. The communication system according to claim 9, further comprising a wireless transmission node that is installed outside the building, and that is configured to transmit radio waves to the first antenna of the radio wave repeater and to receive radio waves from the first antenna of the radio wave repeater.

12. A radio wave repeater, the radio wave repeater comprising:

a first antenna that is on a first surface of a support;

a second antenna that is on the second surface of the support, wherein a direction of a normal vector pointing away from the first surface is different than a direction of a normal vector pointing away from the second surface; and a transmission line through which a radio frequency signal received at the first antenna is transmitted to the second antenna, and a radio frequency signal received at the second antenna is transmitted to the first antenna, wherein the first antenna, the second antenna, and the transmission line are configured such that a directivity of the first antenna is different than a directivity of the second antenna, wherein a direction of polarization of radio waves radiated from the first antenna is different than a direction of polarization of radio waves radiated from the second antenna, wherein an angle between the direction of the normal vector pointing away from the first surface and the direction of the normal vector pointing away from the second surface is greater than 0 degrees and less than 180 degrees, wherein the first antenna or the second antenna comprises a plurality of patch antenna elements arranged in an array, and wherein transmission line lengths for the patch antenna elements increase by a given length between each adjacent row of the array in the negative X-axis.

13. The radio wave repeater according to claim 12, wherein the support is a polygonal prism having three or more faces, or a hollow polygonal cylinder having three or more faces.

14. The radio wave repeater according to claim 12, wherein the support is a triangular prism having three rectangular faces and two triangular ends, the first and second surfaces being different ones of the three rectangular faces.

15. The radio wave repeater according to claim 12, wherein the first surface and the second surface are orthogonal to each other and connected by an L-shaped flexible substrate.

* * * * *